United States Patent

Axtman

Patent Number: 5,645,704
Date of Patent: Jul. 8, 1997

[54] ELECTROSTATIC FILTER DEVICE

[75] Inventor: Gerald J. Axtman, Bismarck, N. Dak.

[73] Assignee: Eugene Sandler, Rockville, Md.

[21] Appl. No.: 237,597

[22] Filed: May 3, 1994

[51] Int. Cl.$^6$ .............. B03C 5/02; B01D 35/06
[52] U.S. Cl. .............. 204/665; 204/672; 204/674
[58] Field of Search .................. 204/302, 305, 204/562, 572, 665, 672, 674

[56] References Cited

U.S. PATENT DOCUMENTS

| | | | |
|---|---|---|---|
| 1,831,075 | 11/1931 | Neeley | 204/276 |
| 2,849,305 | 8/1958 | Frost | 51/307 |
| 2,849,395 | 8/1958 | Wintermute | 204/305 |
| 2,872,408 | 2/1959 | Waterman et al. | 204/302 |
| 3,196,095 | 7/1965 | Wadsworth | 204/149 |
| 3,252,885 | 5/1966 | Griswold | 204/302 |
| 3,324,026 | 6/1967 | Waterman et al. | 204/302 |
| 3,398,082 | 8/1968 | Lochmann et al. | 204/302 |
| 3,445,376 | 5/1969 | Stenzel | 204/302 |
| 3,544,441 | 12/1970 | Griswold | 204/186 |
| 3,655,550 | 4/1972 | Davies | 204/302 |
| 3,729,402 | 4/1973 | Griswold | 204/302 |
| 3,770,605 | 11/1973 | McCoy | 204/188 |
| 3,846,300 | 11/1974 | Inoue | 210/47 |
| 3,852,178 | 12/1974 | Griswold | 204/186 |
| 3,891,528 | 6/1975 | Griswold | 204/186 |
| 3,980,541 | 9/1976 | Aine | 204/186 |
| 4,054,501 | 10/1977 | Nikitin et al. | 204/186 |
| 4,181,591 | 1/1980 | King | 204/275 |
| 4,238,326 | 12/1980 | Wolf | 210/695 |
| 4,252,631 | 2/1981 | Hovarongkura et al. | 204/302 |
| 4,302,310 | 11/1981 | Watson et al. | 204/186 |
| 4,454,016 | 6/1984 | Rabinowitz et al. | 204/308 |
| 4,594,138 | 6/1986 | Thompson | 204/302 |
| 4,800,011 | 1/1989 | Abbott et al. | 204/302 |

Primary Examiner—Kathryn Gorgos
Assistant Examiner—William T. Leader
Attorney, Agent, or Firm—Robert E. Kleve

[57] ABSTRACT

The invention comprises a fluid treatment of electrostatic flocculation of minute particles in a fluid such as oil. The device has a electrostatic chamber which has a plurality of perforated metal screens aligned along a path in the chamber. Means are provided to electrically charge the screens in an alternating polarity along the path with the charge creating a magnetic field on the screens for flocculation of the minute particles. The chamber has inlet ports and outlet ports spaced from one another in the chamber. The plurality of screens have a configuration of a zig zag shape which tends to guide the fluid being received into the chamber from the inlet ports along a reflective path for said minute particles in said fluid to reflect off of said screens of alternating polarity in several directions to said outlet ports for substantially continuous reflection resulting in substantially continuous flocculation of said minute particles along the path of several directions with said path of several directions being substantially longer than the straight line path from the inlet ports to the outlet ports for increased flocculation of said particles while in said chamber with said flocculation acting to enlarge the size of said particles. Filters are provided separate from the chamber for filtering said particles after flocculation with enlargement of said particles facilitating filtration.

2 Claims, 2 Drawing Sheets

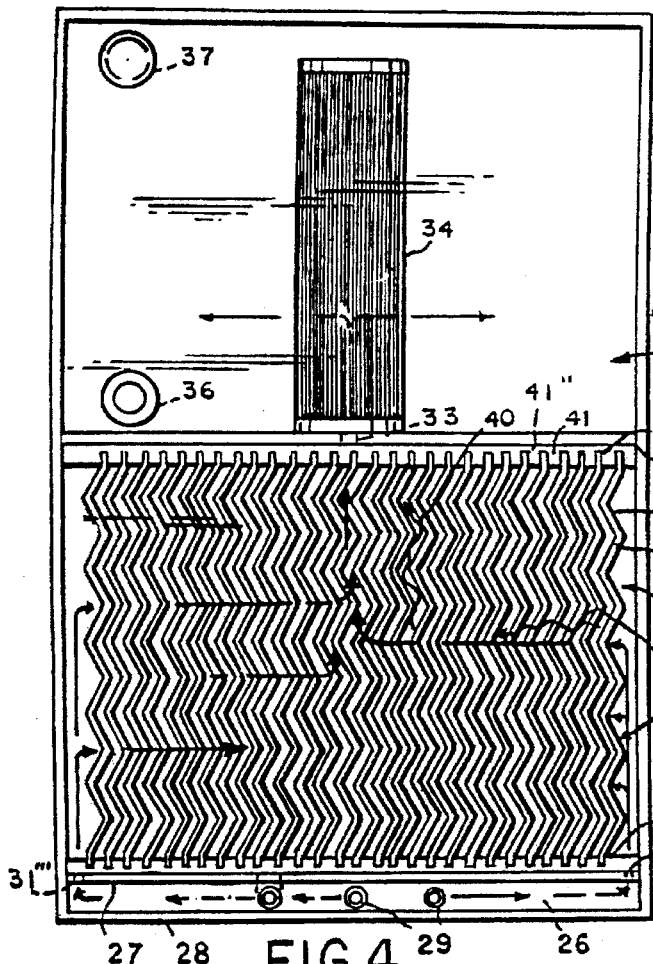
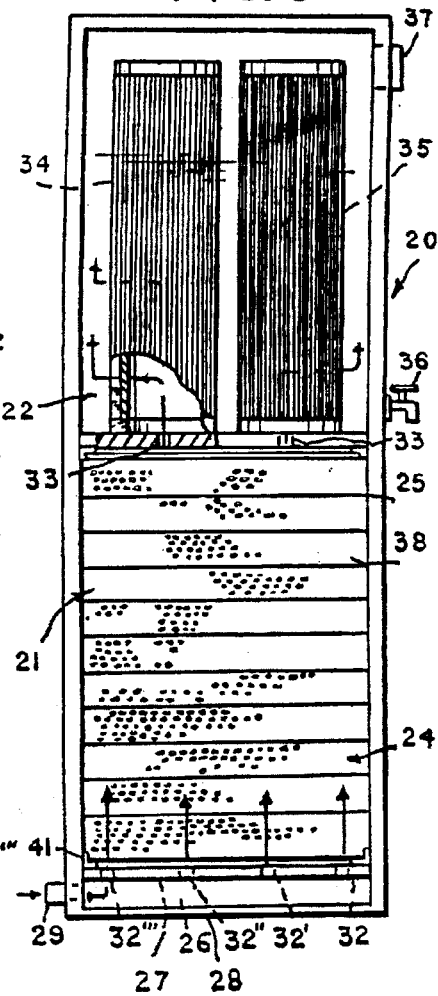
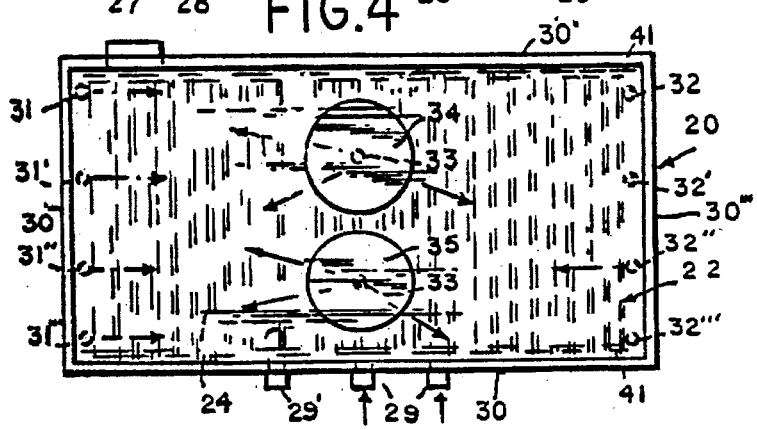

ELECTROSTATIC FILTER DEVICE

This invention relates to a fluid treatment device, more particularly, the invention relates to electrostatic chambers for the flocculation of minute particles in a fluid.

It is an object of the invention to provide a novel electrostatic chamber for electrostatic flocculation of minute particles in a fluid which provides a path for the fluid while in the chamber for extended flocculation, It is a further object of the invention to provide a novel electrostatic chamber for electrostatic flocculation of minute particles in a fluid which provides for extended flocculation of the minute particles while in the chamber with a relatively high rate of flow for the fluid.

It is a further object of the invention to provide a novel chamber for electrostatic flocculation of particles in a fluid at an extended period of time for growing the size of the particles for easier filtration of the particles and with separate filter structure from the chamber for the filtration.

Further objects and advantages of the invention ill become apparent as the description proceeds and when taken in conjunction with the accompanying drawings wherein:

BRIEF DESCRIPTION OF THE DRAWINGS

FIG. 2 is a side elevational view of the fluid oil flocculation and filtration device having the electrostatic chamber with the perforated screens at the bottom and the separate filtration and collection chamber mounted on the top of the device.

FIG. 3 is a front view of the novel fluid oil flocculation and filtration device.

FIG. 4 is a top plan view of the novel fluid oil flocculation and filtration device.

BRIEF DESCRIPTION OF PREFERRED EMBODIMENT OF THE INVENTION

Figure 1:
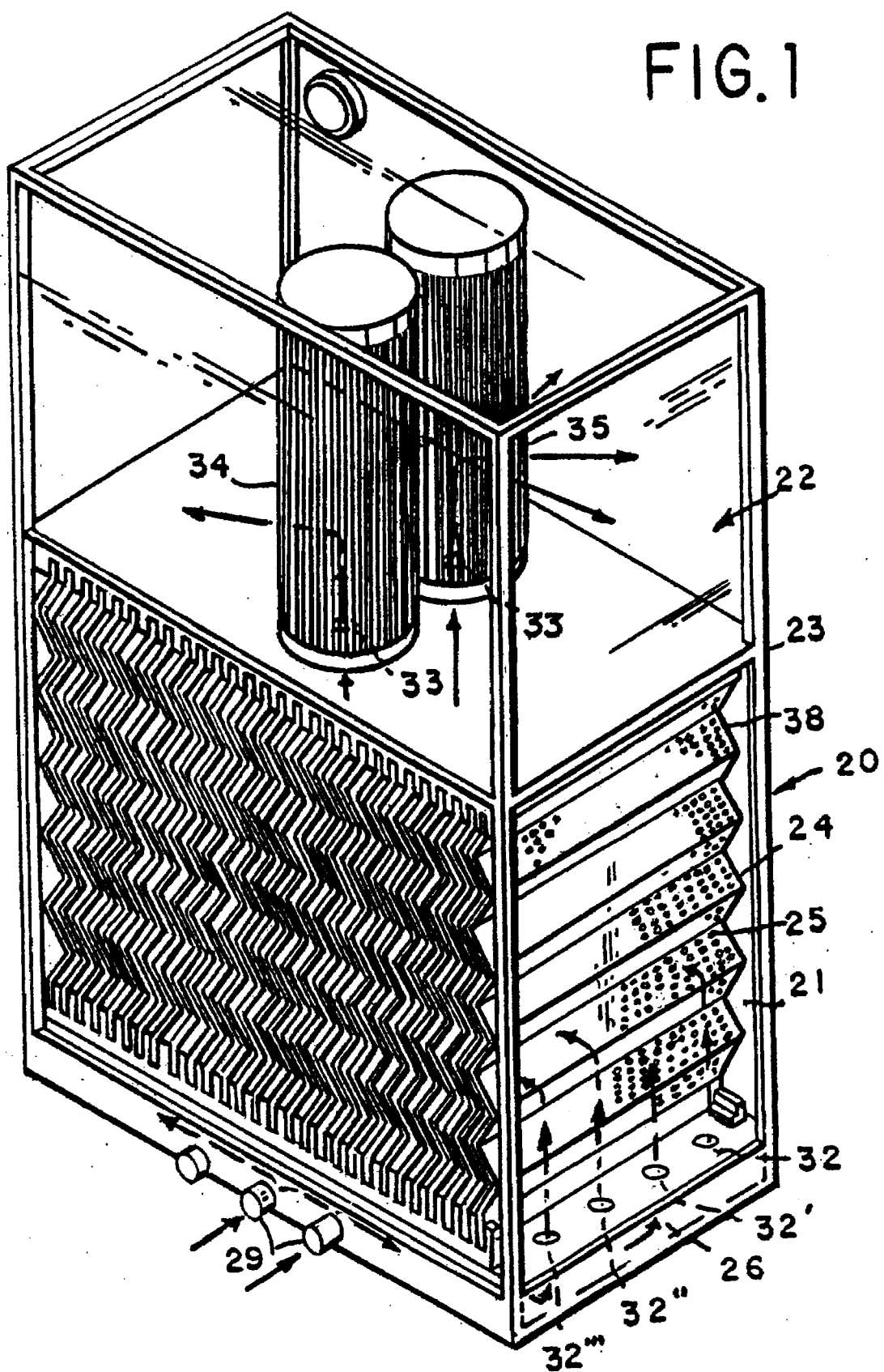
FIG. 1 is a perspective view of the fluid oil electrostatic chamber having the zig zag metal perforated screens serving as electrodes with alternate polarity, with a separate filtering and collection chamber mounted on top the electrostatic chamber.

Briefly stated the invention comprises a fluid oil flocculation and filtration device. The device has an electrostatic chamber with a plurality of zig zag shaped rectangular perforated metal screens as electrodes and aligned in a horizontal row in the chamber. Electric structure provides an electric charge to said screens to charge the screens with alternate polarity in the row for flocculation of minute particles or foreign particles in fluid oil. The chamber has inlet and outlet ports spaced in, communication. The screens configuration tends to guide the oil received in the chamber from the inlet along a reflective path for minute particles in the fluid so as to reflect off said screens of alternating polarity in several directions to said outlet ports for substantially continuous flocculation of said minute particles along a path in several directions which path in several directions is substantially longer than a straight line path of communication from the inlet to the outlet ports for increased flocculation of said minute particles while in said chamber to increase the enlargement of the particles by the flocculation. Filters are mounted separate from the chamber for filtering the particles after flocculation with the increased enlargement of the particles facilitating their filtration.

Referring more particularly to the drawings, in FIGS. 1–3 the fluid filter device 20 is illustrated which is used for filtering out minute foreign particles in oil. The filtering device has an electrostatic chamber 21 and a collection chamber 22. The chambers are watertight with a wall 23 separating the chambers in watertight relation. A plurality of zig zag shaped, rectangular aluminum sheets 24 are mounted in a horizontal row along the electrostatic chamber. The sheets 24 have openings, perforations, or apertures 25 which comprise approximately 30 percent of the area of each sheet. Below the electrostatic chamber 21 is an oil fluid inlet chamber 26. A pair of horizontal walls 27 and 28 form the top and bottom respectively of the inlet chamber, with the wall 27 forming the bottom of the electrostatic chamber.

A fluid pump, not shown, is provided with suitable connections for pumping oil to be filtered through a pair of inlet ports 29 in the front wall 30 forming the front wall of the inlet chamber, electrostatic chamber, and collection chamber. Four inlet ports 31, 31', 31", and 31'" are provided at one end of the electrostatic chamber through the wall 27 to provide fluid communication between the inlet chamber 26 and the electrostatic chamber at one end of the row of perforated screens 24. A similar series of four inlet ports 32, 32', 32", and 32'" are provided in the bottom wall 27 at the electrostatic chamber 21, to provide fluid communication between the inlet chamber 26 at the other end of the row of screens 24 in the chamber 21.

A pair of outlet ports 33 in the wall 23, separating the electrostatic chamber and collection chamber, are provided to provide fluid communication between fluids in chamber 23 and the inside of the filters 34 and 35 mounted in the collection chamber. The filters 34 and 35 are a conventional paper filter for filtering the fluids coming from the electrostatic chamber.

A conventional manual controlled valve 36 is mounted in the back wall 30' of the collection chamber. The back wall 30' also forms the back wall of the electrostatic chamber and the inlet chamber. A pair of opposing walls 30" and 30'" form the opposing side walls of the collection chamber, electrostatic chamber, and inlet chamber. The walls 30, 30', 30", and 30'" may be made of translucent plastic material.

The valve 36 has a handle which can be turned to open and close the valve 36 for drawing or draining fluid out from the collection chamber and is located at the bottom of the collection chamber in fluid communication therewith. A conventional pressure release valve 37 is mounted to the top of the collection chamber and provides a pressure release of the air in the collection chamber 22 due to variations in the level of fluid oil in the chamber.

The screens 24 are mounted in slots 41' located at spaced intervals along the length of one flange 41" of each of the pair of L-shaped rods 41. The pair of L-shaped rods 41 extend along opposite sides of upper portions of the electrostatic or reactive chamber 21; and are fixed to the sides 30 and 30' of the device. A similar pair of L-shaped plastic rods 41 extend along opposite sides of the lower portion of the chamber 21 and are fixed to the sides 30 and 30" of the device. The rods 41 are made of plastic material to thereby support each of the screens 24 in spaced, electrically insulated relation to one another.

Port 29' is an elbow drain port for the electrostatic chamber. The Filter Device operates as Follows:

Oil to be filtered will be introduced by being pumped through the inlet openings 29 into the inlet chamber 26. The oil will travel in the chamber 26 out and up through the opposing inlet ports 31–31'" and 32–32" into opposite ends of the electrostatic chamber 21 along the bottom of the chamber. As the electrostatic chamber fills with oil, oil will travel inward horizontally through the perforations or apertures 25 of the screens. The screens will be charged electrostatically by D.C. current and about the apertures so that as the fluid passes through the apertures, it will cause flocculation or growth of any foreign minute particles in the oil traveling through the apertures. When the chamber 21 is completely filled with oil, with continued pumping, the oil will travel out through the outlet ports 33 and 33' into the inside of the paper filters 34 and 35, then radially out the filters and out the valve 36.

The inward V-shaped portions 38 of the screen will act to direct oil from the inlet ports at the bottom of the chamber inward toward the center of the chamber from opposite sides. The upper portions 38' of the V-shaped portions 38, inclined inward and downward, will direct oil, as it contacts solid portions of the screen portions 38', between the apertures, downward and inward horizontally toward the next inward aperture, thereby tending to keep the oil at a lower level in the chamber longer as the oil travels inward and upward toward the outlet ports 33 and 33'. By keeping the oil traveling upward longer while traveling inward, it enables the oil to contact more apertures in the inner layers of screen along the bottom, before traveling upward along the screens to the outlet ports 33 and 33'. This longer contact of the oil with the screens allows more time for flocculation to occur and thus allows for more growth of minute particles or more flocculation of the particles. Also, by tending to cause the oil to travel in two directions, inward and then upward to the outlet ports, the flocculation of the particles can occur while the fluid travels inward through the apertures 25, as well as occur while the oil or fluid passes upward along the screen by the oil contacting the screen in two directions of flow for increased flocculation of minute particles in the oil or fluid.

While the fluid flows inwardly through the apertures in the screens and it appears it is the primary flow of the fluid in that this action appears to provide the main flocculation of the particles; the flow of the fluid upward along the screens also provides substantial additional flocculation of the particles.

Most conventional paper filters 34 and 35 of the type intended for use will have apertures in the paper which are large enough so that the filter will not filter out minute particles of less than five microns in diameter. The growth of minute particles by the flocculation, from the electrostatic process, increases many minute particles to a diameter greater than five microns, so that the filters when the minute particles have been flocculated will filter out these particles resulting in a much cleaner oil.

Also, since the V-shape of the screens extend horizontally across the screens, as the fluid flows upward, there is additional contact of the particulate matter with the upper plate of the V of the next adjacent screen and it being of opposite polarity. As the particles reflect off one screen in an upward path onto the next screen above additional flocculation occurs of the sub-micronic particles, than would otherwise occur if the screens were simply straight in shape in an upward direction. The V-shape of the screens causes a spaced overlapping of the screens in an upward direction with the fluid reflecting off the screens as described and illustrated in the drawings and designated by the arrow 40. It has been found that an approximately one inch spacing between the screens is satisfactory for the flocculation of the particles.

Thus the configuration of the screens or electrodes forces or directs the fluid to follow an irregular reflective path by means of the overlapping Y shapes of the screens in one direction and the perforations in the screens in the other direction thereby increasing the contact of the fluid with the electrode surfaces and thereby increasing the flocculation operation.

The fluid also flows to the left and right of the inlets when viewed from FIG. 3, as well as inward and upward.

The screens may also be made of a circular configuration with the V shapes extending annularly about the circular screens.

The electrical circuitry for the electrostatic operation of the electrodes or screens is conventional and well known in the art using a D.C. current of a high voltage with screens in the row being alternately connected positive and negative in the D.C. current for the electrostatic operation.

Thus it will be seen that a novel electrostatic chamber for flocculation of minute particles in a fluid for their subsequent filtration has been provided.

Thus the electrostatic invention results in providing or directing an irregular, reflective path for the fluid to follow through and off the screens surfaces in more than one direction in the chamber for extended surface contact of the fluid with the screens or electrodes for extended flocculation of the minute particles in the fluid, since this contact produces the flocculation. The first reflective, irregular path is the generally horizontal direction through the perforations in the screens as indicated by the arrow 40'. The second irregular reflective path is generally vertically upward reflecting off the insides and outsides of the V shapes of the screens as designated by the numeral 40.

The screens will be uniformly perforated throughout their length and with closely spaced perforations of approximately ⅛th inch in diameter.

It will be obvious that various changes and departures may be made to the invention without departing from the spirit and scope thereof, and accordingly, it is not intended that the invention be limited to that specifically described in the specification or as illustrated in the drawings, but only as set forth in the appended claims.

What is claimed is:

1. A filter device comprising an electrostatic chamber and a collection chamber separate from one another with the collection chamber positioned adjacent to the electrostatic chamber and being separated from said electrostatic chamber by a wall; said electrostatic chamber and said collection chamber each having inlet and outlet port means with said outlet port means of said electrostatic chamber communicating with said inlet port means of said collection chamber;

said electrostatic chamber having a plurality of rectangular perforated metal panels positioned in a longitudinally extending row so as to extend in width and height laterally of the length of the row and spaced from one another longitudinally to allow fluid to pass therebetween;

said panels having a plurality of bent portions bent longitudinally to allow panels, adjacent one another, to laterally and alternately overlap one another in the longitudinal spaces between the panels at a plurality of intervals laterally along the height of the panels so as to interrupt a straight path for fluid laterally along the longitudinal spaces upward between the panels;

said inlet port means of said electrostatic chamber comprising inlet opening means positioned along the bottom of the chamber adjacent to an end of the row of panels; said outlet port means being formed in the wall separating said electrostatic chamber and said collection chamber and being offset longitudinally and laterally up from said inlet port means of said electrostatic chamber;

means to apply a high voltage to said panels in alternating relation longitudinally along the row whereby an electrostatic field may be produced on the panels;

pump means to pump fluid into said electrostatic chamber through said inlet port means, whereby fluid having minute particles may be pumped into said electrostatic chamber and may travel laterally up along the longitudinal spaces between the panels and may travel longitudinally through the perforations in the panels; and the fluid in traveling laterally along the longitudinal spaces between the panels, may flow along a reflective path off the bent portions of the panels from one of said panels to the next adjacent panel and back within the electrostatic chamber, with the alternating polarity of the panels next to one another causing flocculation of the minute particles in the fluid;

and whereby said fluid may travel longitudinally through the perforations in the panels to cause flocculation of the minute particles with said flocculation increasing the size of the minute particles;

said collection chamber having filtering means surrounding said inlet port means of the collection chamber and being adapted to receive fluid from the electrostatic chamber with said fluid flowing through the filtering means to said outlet port means of the collection chamber to filter out the minute particles increased in size through flocculation.

2. A filter device comprising an electrostatic chamber and a collection chamber separate from one another with the collection chamber positioned adjacent to the electrostatic chamber and being separated from said electrostatic chamber by a wall; said electrostatic chamber and said collection chamber each having inlet and outlet port means with said outlet port means of said electrostatic chamber communicating with said inlet port means of said collection chamber;

said electrostatic chamber having a plurality of elongated perforated metal panels positioned in a longitudinally extending row so as to extend laterally of the length of the row and spaced from one another longitudinally to allow fluid in the electrostatic chamber to pass laterally therebetween;

said panels having a plurality of longitudinally extending portions extending longitudinally into the spaces between the panels to allow panels, adjacent one another, to alternately laterally overlap one another as well as longitudinally overlap the longitudinal spaces between the panels thereby so as to interrupt a straight path of fluid laterally along the longitudinal spaces between the panels in at least one lateral direction;

means to apply a high voltage to said panels in alternating relation longitudinally along the row whereby an electrostatic field may be produced on the panels;

said inlet port means of said electrostatic chamber comprising inlet opening means positioned along the bottom of the chamber adjacent to an end of the row of panels; said outlet port means of said electrostatic chamber being formed in the wall separating said electrostatic chamber and said collection chamber and being offset longitudinally and laterally from said inlet port means;

pump means to pump fluid into said electrostatic chamber through said inlet port means;

whereby fluid having minute particles therein may be pumped into said electrostatic chamber through said inlet port means and may travel laterally along the longitudinal spaces between the panels and may travel longitudinally through the perforations in the panels to the outlet port means;

and the fluid, in traveling laterally along the longitudinal spaces between the panels, may flow along a reflective path off the longitudinally extending portions from one of said panels to the next adjacent panel and back within the electrostatic chamber, with the alternating polarity of the panels next to one another causing flocculation of minute particles in the fluid;

and whereby the fluid may travel longitudinally through the perforations in the panels to cause flocculation of the minute particles with the flocculation increasing the size of the minute particles;

filtering means in said collection chamber surrounding said inlet port means of the collection chamber adapted to receive fluid through the outlet port means of said electrostatic chamber with said fluid flowing through the filtering means to said outlet port means of the collection chamber to filter out the minute particles of increased size through flocculation.

* * * * *